(12) United States Patent
Berndl et al.

(10) Patent No.: US 12,429,007 B2
(45) Date of Patent: Sep. 30, 2025

(54) REGULATING DEVICE WITH AN ELECTRONIC CONTROL UNIT FOR REGULATING BOOST PRESSURE IN A SUPERCHARGED INTERNAL COMBUSTION ENGINE

(71) Applicant: Bayerische Motoren Werke Aktiengesellschaft, Munich (DE)

(72) Inventors: Georg Berndl, Seitenstetten (AT); Georg Gruber, Wolfsbach (AT)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/711,718

(22) PCT Filed: Jan. 16, 2023

(86) PCT No.: PCT/EP2023/050791
§ 371 (c)(1),
(2) Date: May 20, 2024

(87) PCT Pub. No.: WO2023/151893
PCT Pub. Date: Aug. 17, 2023

(65) Prior Publication Data
US 2025/0012225 A1    Jan. 9, 2025

(30) Foreign Application Priority Data
Feb. 8, 2022   (DE) .................... 10 2022 102 897.6

(51) Int. Cl.
*F02D 41/00*   (2006.01)
*F02B 37/013*   (2006.01)
(Continued)

(52) U.S. Cl.
CPC ........ *F02D 41/0007* (2013.01); *F02B 37/013* (2013.01); *F02B 37/162* (2019.05);
(Continued)

(58) Field of Classification Search
CPC ............... F02B 37/004; F02B 37/013; F02B 37/18–186; F02B 37/24
See application file for complete search history.

(56) References Cited

U.S. PATENT DOCUMENTS

| | | | |
|---|---|---|---|
| 2010/0083656 | A1 | 4/2010 | Parlow et al. |
| 2011/0036086 | A1 | 2/2011 | Liu et al. |

FOREIGN PATENT DOCUMENTS

| | | |
|---|---|---|
| DE | 101 33 918 A1 | 2/2003 |
| DE | 10 2010 033 313 A1 | 4/2011 |

(Continued)

OTHER PUBLICATIONS

International Search Report (PCT/ISA/210) issued in PCT Application No. PCT/EP2023/050791 dated Apr. 25, 2023 with English translation (6 pages).

(Continued)

*Primary Examiner* — Ngoc T Nguyen
(74) *Attorney, Agent, or Firm* — Crowell & Moring LLP

(57) ABSTRACT

A regulating device comprising an electronic control unit for regulating boost pressure in a supercharged internal combustion engine with two-stage supercharging, i.e. with a first low-pressure stage (ND) and a second high-pressure stage (HD). The high-pressure stage (HD) has a rigid high-pressure turbine and a controllable regulating flap (RK). The low-pressure stage (ND) has a variable adjustable turbine geometry (VTG). The electronic control unit contains a regulating module that is designed, in particular via an appropriately programmed computer program product, for basic adjuster regulation in such a way that the boost pressure regulation is carried out solely by way of the adjustable turbine geometry (VTG) of the low-pressure stage (ND), wherein the regulating flap (RK) of the high-pressure stage (HD) is controlled in the fully closed state.

8 Claims, 4 Drawing Sheets

(51) Int. Cl.
    *F02B 37/16*         (2006.01)
    *F02B 37/18*         (2006.01)
    *F02B 37/24*         (2006.01)
    *F02B 39/16*         (2006.01)

(52) U.S. Cl.
    CPC ............ *F02B 37/183* (2013.01); *F02B 37/24* (2013.01); *F02B 2039/166* (2013.01)

(56) References Cited

FOREIGN PATENT DOCUMENTS

| | | | | |
|---|---|---|---|---|
| DE | 20 2005 022 022 U1 | 5/2012 | | |
| DE | 102013215574 A1 * | 2/2015 | ............ | F02B 37/004 |
| DE | 10 2020 208 938 A1 | 1/2022 | | |
| EP | 1 101 917 A2 | 5/2001 | | |
| EP | 1 387 058 A2 | 2/2004 | | |
| EP | 1 640 583 A2 | 3/2006 | | |
| EP | 3 473 830 A1 | 4/2019 | | |
| GB | 2533351 A * | 6/2016 | ............ | F02B 37/004 |

OTHER PUBLICATIONS

German-language Written Opinion (PCT/ISA/237) issued in PCT Application No. PCT/EP2023/050791 dated Apr. 25, 2023 with English translation (10 pages).
German-language Search Report issued in German Application No. 10 2022 102 897.6 dated Jun. 29, 2022 with partial English translation (10 pages).

\* cited by examiner

REGULATING DEVICE WITH AN ELECTRONIC CONTROL UNIT FOR REGULATING BOOST PRESSURE IN A SUPERCHARGED INTERNAL COMBUSTION ENGINE

BACKGROUND AND SUMMARY

This disclosure relates to a regulating device having an electronic control unit for regulating boost pressure in a supercharged internal combustion engine having at least two actuators.

Diverse regulators for regulating boost pressure in supercharged internal combustion engines having at least two actuators are known.

An object of the present disclosure is to improve a regulator for regulating boost pressure such that the fuel consumption and the emissions are reduced and the participating components are protected.

This disclosure relates to a regulating device having an electronic control unit for regulating boost pressure in a supercharged internal combustion engine having at least two-stage supercharging, thus having at least one low-pressure stage (ND) and one high-pressure stage (HD). The high-pressure stage (HD) has a rigid high pressure turbine and a controllable regulating flap (RK). The low-pressure stage (ND) has a variably adjustable turbine geometry (VTG). According to the disclosure, the electronic control unit contains a regulating module, which is designed in particular by a correspondingly programmed computer program product for basic one-actuator regulation in the form that the boost pressure is regulated solely by way of the adjustable turbine geometry (VTG) of the low-pressure stage (ND), wherein the regulating flap (RK) of the high-pressure stage (HD) is controlled in the fully closed state. The disclosure thus relates to the transition from two-actuator regulation into fundamental one-actuator regulation for regulating the boost pressure by an actuator of the low-pressure stage ND, wherein only the boost pressure target value is specified as a manipulated variable.

The disclosure is based on the following considerations. In many technical systems, multiple actuators are used to achieve a target variable. Examples result in the regulation of boost pressure of supercharged internal combustion engines in particular in variants having multistage supercharging, thus having a low-pressure stage (ND) and a high-pressure stage (HD). On the one hand, there are variants in which multiple actuators are used on the high-pressure stage (HD), such as an exhaust gas turbocharger having variable turbine geometry (also abbreviated as HD-VTG) and a bypass flap (exhaust gas regulating flap, also abbreviated as RK). On the other hand, there are simpler HD topologies having a rigid high-pressure turbine and at least an electronically controllable regulating flap (RK).

The present disclosure is preferably used for two-stage supercharged diesel engines having the last-mentioned HD topology, thus a rigid high-pressure turbine having regulating flap (RK) on the high-pressure stage. According to the disclosure, however, a low-pressure stage (ND) having variably adjustable turbine geometry (ND-VTG) is additionally used and incorporated directly into the boost pressure regulation.

A significant boost pressure increase in the two-stage characteristic map range (actuator duty cycle depending on the engine speed and boost pressure target value) is possible by way of the disclosure. This boost pressure increase in turn enables a reduction in emissions and/or consumption. If the boost pressure is not increased, a flushing gradient advantage thus results due to the new regulation strategy, which is also reflected in a lower consumption.

In two-stage supercharging, two target values are normally always specified in the scope of the boost pressure regulations, namely first the (total) boost pressure target value in the suction system, thus after both compressor stages (ND and HD) and after the charge air cooler (LLK), and secondly the (target) pre-compression pressure ratio. The (target) pressure is set here by the low-pressure compressor, which results by the multiplication of the (target) precompression pressure ratio with the (actual) pressure before the low-pressure compressor, wherein the ND compressor capacity is regulated by way of the ND-VTG on the ND stage. The pressure still missing on the (total) boost pressure target value is provided by the high-pressure compressor. The HD compressor capacity is regulated by way of the regulating flap (RK). According to the prior art, the boost pressure target value for the regulation is selected here as a precaution so that the regulating flap is not completely closed. This regulating reserve is required if there are efficiency losses of the turbocharger (aging) or changes of the ambient conditions (reduction of ambient pressure). This concept is therefore referred to as two actuator regulation, since the boost pressure regulation is provided simultaneously by two actuators (regulating flap RK and ND-VTG) and via two target values (boost pressure target value and precompression pressure ratio).

This two-actuator regulation has proven not to have optimal efficiency for boost pressure regulation using a rigid high-pressure turbine, since the entire exhaust gas mass flow or all of the energy of the exhaust gas cannot be used by the high-pressure turbine for the boost pressure buildup; i.e., a part of the exhaust gas always flows past the high-pressure turbine due to the regulation reserve because of the regulating flap which is always somewhat open and therefore remains unused. In this regard, the disclosure is based on the finding that the regulating flap could be closed via applicable limits, however, then the boost pressure regulation would be inactive, since the HD compressor having rigid turbine geometry would always provide maximum pressure and the ND compressor adjusts the specified precompression pressure ratio. However, this would not be desirable with respect to emission stability and component protection.

This disclosure provides the adjustment of the boost pressure target value with closed regulating flap solely by way of the VTG on the ND stage by way of a correspondingly programmed regulating module, in particular in the electronic engine control unit. Only one target value, namely the (total) boost pressure target value is still specified here. To adjust the boost pressure target value, according to the disclosure, the maximum possible high-pressure is thus always provided by the HD compressor due to the closed regulating flap and the ND compressor regulates the missing component to achieve the boost pressure target value. This concept is also designated hereinafter as "regulator transfer", since the boost pressure regulation based on the boost pressure target value as the only manipulated variable is transferred solely to the low-pressure actuator, thus the ND-VTG, wherein the regulating flap is closed and remains closed.

The high-pressure regulating flap is thus fundamentally no longer used as an actuator for the boost pressure regulation. The term "fundamentally" means in particular that this concept of the regulator transfer applies for the largest part of the possible operating points. The regulating flap can be used in exceptional cases for a smaller defined high load part of the possible operating points as a second actuator (two-actuator regulation), wherein this smaller high load part of the possible operating points is definable in particular by exceeding a specified full load speed limiting value and/or a specified boost pressure high load limiting value. The application of such limiting values is to be carried out, for example, depending on the level of a mass flow reached, which would result in component damage (for example on the rigid high-pressure turbine). The regulator transfer according to the disclosure is thus suppressed only in the few operating points which would result in component damage. However, the regulator transfer is otherwise fundamentally activated in order to reduce the fuel consumption; this is because the regulator transfer results in lower exhaust gas counter pressure at equal boost pressure target value.

In other words, the regulator transfer is fundamentally activated if a lower exhaust gas counter pressure is thus achieved than by the two-actuator regulation.

The following is a summary of certain advantages:
1. Consumption advantage, since equal boost pressure is possible with reduced exhaust gas counter pressure due to the pressure ratio shift on the compressor side having closed regulating flap.
2. In addition, the emission potential is present due to: i) the possibility of boost pressure increase in operating points with open ND stage, which results in soot or NOx reduction; and, ii) the small flushing gradient variations in dynamic processes due to a one-actuator regulation, which results in more stability in the air mass regulation in comparison to a two-actuator regulation.
3. Boost pressure regulation by way of the nonlinear regulating flap (two-actuator regulation) is only required in high load operating points. Due to the fundamental regulator transfer according to the disclosure (one-actuator regulation) instead of the two-actuator regulation: i) problems which recur again and again with the electrical regulating flap (end stop training, RK oscillation) are eliminated in almost the entire two-stage range; and, ii) a WLTC with one-actuator regulation is possible in most occurring operating points.

BRIEF DESCRIPTION OF THE DRAWINGS

The disclosure is explained in more detail by way of an exemplary embodiment and on the basis of a drawing.

DETAILED DESCRIPTION OF THE DRAWINGS

Figure 1:
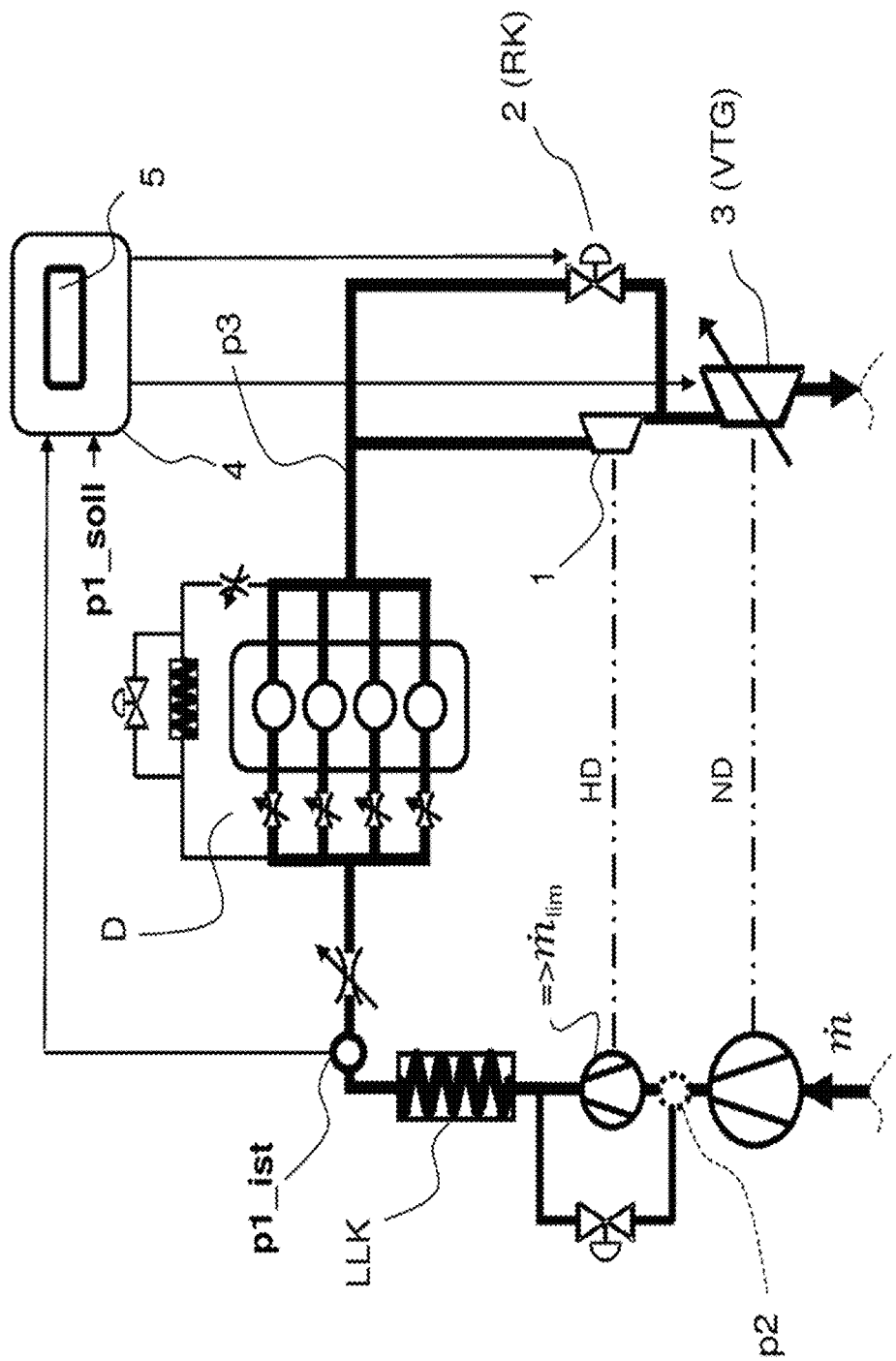
FIG. 1 shows a detail of a double supercharged internal combustion engine having essential components according to the disclosure.

FIG. 1 shows a detail of essential components of a double supercharged diesel engine D as an example of an internal combustion engine having a rigid turbocharger 1 (without VTG actuator) and having an exhaust gas bypass regulating flap RK in a high-pressure path HD and having a controllable turbocharger 3 in a low-pressure path ND. The turbocharger 3 in the low-pressure path ND has a variably adjustable turbine geometry (ND-VTG) as the actuator for controlling the compression. The regulating flap RK has a variably adjustable valve 2 (RK actuator). Furthermore, the internal combustion engine D has a pressure sensor on the input side for detecting the actual boost pressure p1_ist and optionally a pressure sensor for detecting the precompression pressure p2, wherein the precompression pressure p2 does not have to (still) be detected for the disclosure.

The internal combustion engine D and in particular also the boost pressure p1 is regulated by an electronic control unit 4. For example, the current boost pressure p1_ist is the input signal of the electronic control unit 4. The boost pressure target value p1_soll is also specified in the electronic control unit 4 as a reference variable of a regulating module 5. Those skilled in the art will appreciate that the electronic control unit 4 may comprise a suitable engine control unit (ECU) and/or engine control module (ECM) having a processing unit (e.g., a microcontroller or a microprocessor) and an associated memory (e.g., ROM, RAM, PROM, EEPROM, etc.) for storage of software, programs, and/or logic to be executed by the processing unit. The regulating module 5 may comprise software, programs, and/or logic to be executed by the processing unit.

Figure 2:
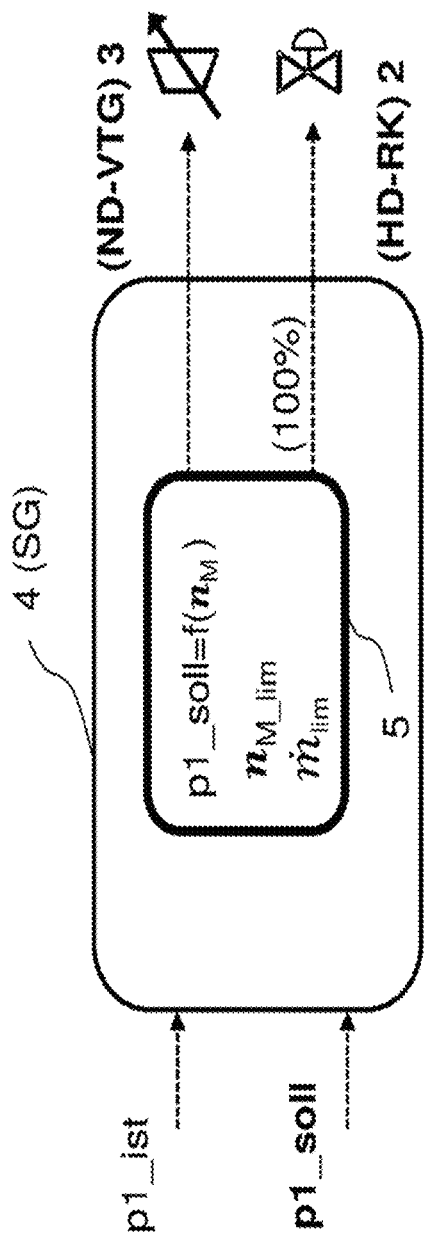
FIG. 2 shows an enlargement of the control unit having a regulating module according to the disclosure.

The control unit 4 is shown in somewhat more detail in FIG. 2. The output signals of the control unit 4 are the actuation signals for the ND-VTG actuator 3 (VTG) and the HD-RK actuator 2 (RK).

Figure 3:
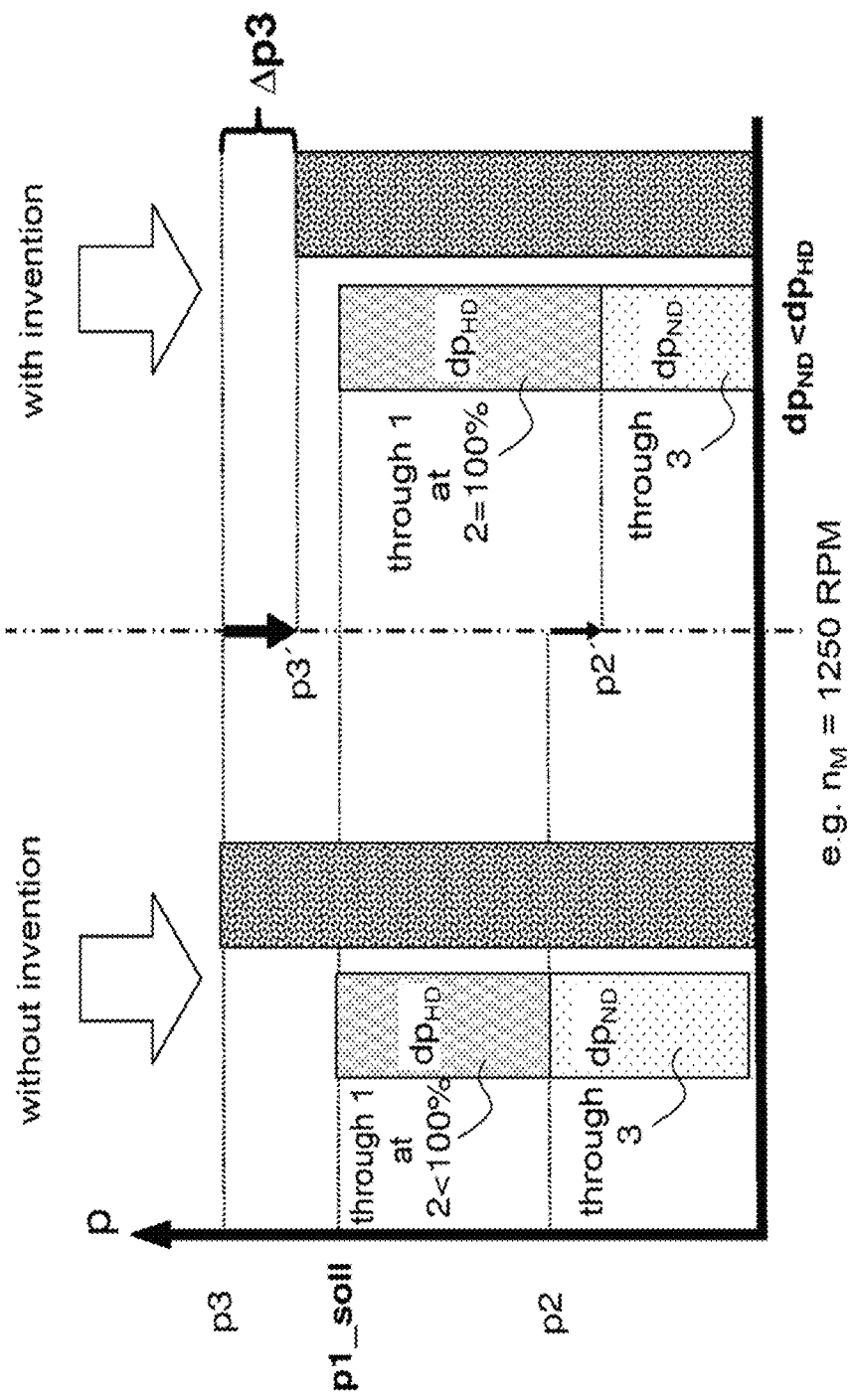
FIG. 3 shows the effect of the disclosure in comparison to the prior art for a specific engine speed; and, FIG. 4 shows characteristic maps according to the disclosure for the duty cycles of the affected actuators in comparison to the characteristic maps according to the prior art.

The design (in particular programming) of the regulating module 5 and its effect will be explained in more detail in conjunction with FIG. 3.

The regulating module 5 is designed for a fundamental one-actuator regulation in the form that the boost pressure regulation is performed solely by way of the adjustable turbine geometry ND-VTG of the turbine 3. The regulating flap RK is controlled via the valve 2 in the high-pressure stage HD in the completely closed state, for example, via a duty cycle of 100%.

This one-actuator regulation ("regulator transfer") is fundamentally activated when a lower exhaust gas counter pressure p3 is thus achieved (see also FIG. 1 and reduction by Δp3 in FIG. 3) than by the two-actuator regulation.

Figure 4:
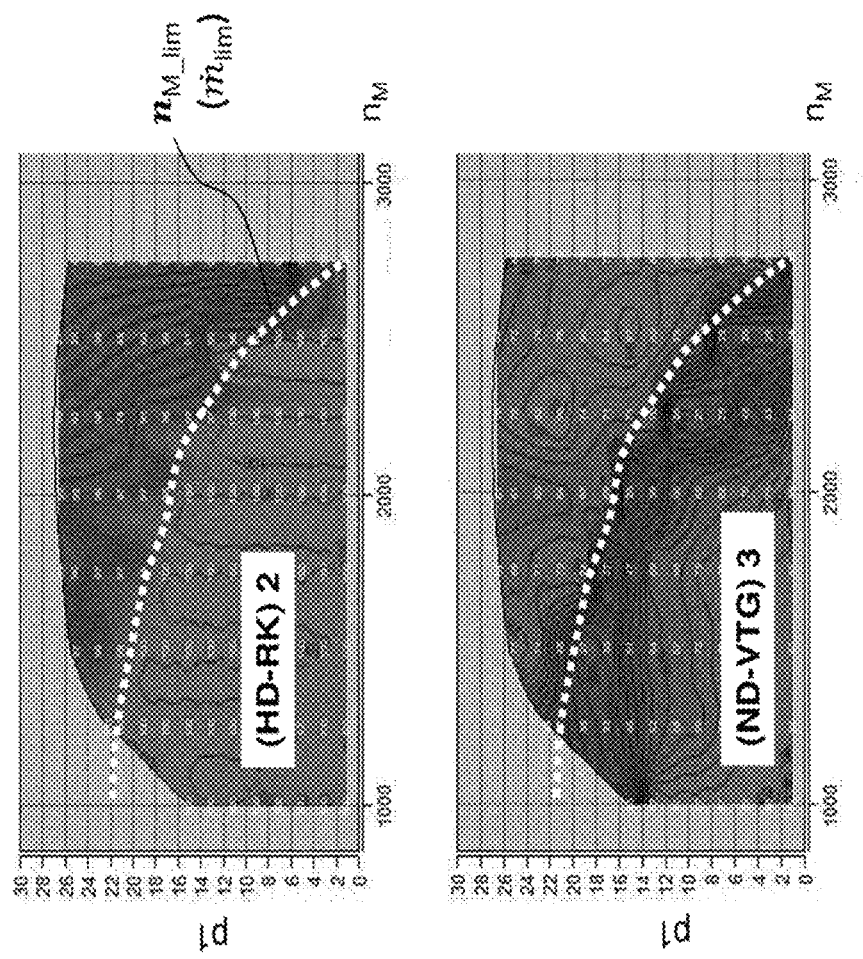

FIG. 4 shows the characteristic maps according to the disclosure for the duty cycles of the affected actuators 2 and 3.

Notwithstanding the fundamental one-actuator regulation according to the disclosure, the regulating flap RK is used as an exception via the duty cycle (see white numbers in the characteristic maps) at the valve 2 for a smaller defined high load part of the possible operating points as a second actuator (duty cycle <100%) for two-actuator regulation. This smaller high load part of the possible operating points is preferably defined here in particular by exceeding a specified full load speed limiting value $n_{M\_lim}$ and/or a specified boost pressure limiting value and/or a mass flow limiting value $\dot{m}_{lim}$ related to component protection. The limiting values can be empirically determined and stored in the control unit 4.

The invention claimed is:
1. A regulating device comprising:
an electronic control unit for regulating boost pressure in a turbocharged internal combustion engine having at least two-stage turbocharging, having a low-pressure stage and a high-pressure stage, wherein the high-pressure stage has a rigid high-pressure turbine and a controllable bypass regulating flap, and wherein the low-pressure stage has a turbine having variably adjustable turbine geometry, and a regulating module in the electronic control unit, configured for a one-actuator regulation in the form that boost pressure regulation is performed solely by way of the adjustable turbine geometry of the low-pressure stage to achieve a specified boost pressure target value, wherein the regulating flap of the high-pressure stage is controlled in the completely closed state, wherein the regulating flap is used for a first defined high load part of the possible operating points as a second actuator for two-actuator regulation, wherein the first defined high load part is smaller than a second defined high load part and the first high load part of the possible operating points is definable by: i) exceeding a specified full load speed limiting value, and/or ii) a specified boost pressure limiting value, and/or iii) a specified mass flow limiting value related to component protection.

2. The regulating device according to claim 1, wherein the one-actuator regulation is activatable when a lower exhaust gas counter pressure is thus achieved than by a two-actuator regulation.

3. A motor vehicle having the regulating device according to claim 1.

4. The regulating device according to claim 1, wherein the boost pressure target value is a variable manipulated by the regulating device.

5. A regulating device comprising:

an electronic control unit for regulating boost pressure in a turbocharged internal combustion engine having at least two-stage turbocharging, having a low-pressure stage and a high-pressure stage, wherein the high-pressure stage has a rigid high-pressure turbine and a controllable bypass regulating flap, and wherein the low-pressure stage has a turbine having variably adjustable turbine geometry, and a regulating module in the electronic control unit that is configured to perform a one-actuator regulation in which boost pressure regulation is performed solely by way of the adjustable turbine geometry of the low-pressure stage to achieve a specified boost pressure target value, wherein the regulating flap of the high-pressure stage is controlled in the completely closed state, such that:

the high-pressure stage delivers its maximum possible boost pressure, the low-pressure stage delivers a given amount of boost pressure, and the given amount of boost pressure corresponds to a difference between the specified boost pressure target value and the maximum possible boost pressure of the high-pressure stage, wherein the regulating flap is used for a first defined high load part of the possible operating points as a second actuator for two-actuator regulation, wherein the first defined high load part is smaller than a second defined high load part and the first high load part of the possible operating points is definable by: i) exceeding a specified full load speed limiting value, and/or ii) a specified boost pressure limiting value, and/or iii) a specified mass flow limiting value related to component protection.

6. The regulating device according to claim 5, wherein the one-actuator regulation is activatable when a lower exhaust gas counter pressure is thus achieved than by a two-actuator regulation.

7. A motor vehicle having the regulating device according to claim 5.

8. The regulating device according to claim 5, wherein the boost pressure target value is a variable manipulated by the regulating device.

* * * * *